Figure 1:
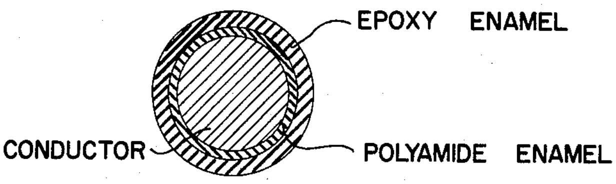
Figure 2:
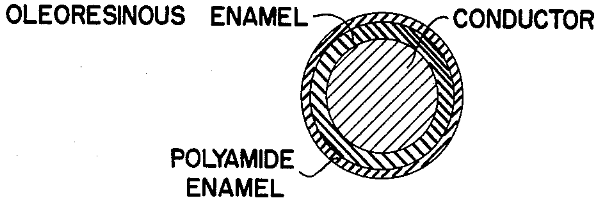
Figure 3:
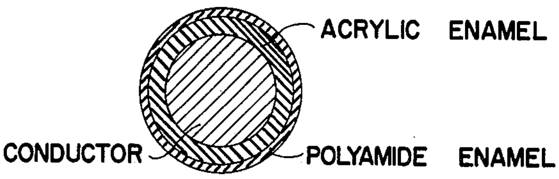

Nov. 30, 1965 E. LAVIN ETAL 3,220,882

METAL CONDUCTOR HAVING ALTERNATE LAYERS OF EPOXY ENAMEL AND POLYAMID ENAMEL COATINGS

Filed May 22, 1961

EDWARD LAVIN
ALBERT H. MARKHART
CHARLES F. HUNT
INVENTOR

BY Karl H. Haag
ATTORNEY

United States Patent Office 3,220,882

Patented Nov. 30, 1965

3,220,882

METAL CONDUCTOR HAVING ALTERNATE LAYERS OF EPOXY ENAMEL AND POLYAMID ENAMEL COATINGS

Edward Lavin, Longmeadow, Albert H. Markhart, Wilbraham, and Charles F. Hunt, Springfield, Mass., assignors, by mesne assignments, to Monsanto Company, a corporation of Delaware Filed May 22, 1961, Ser. No. 111,470
8 Claims. (Cl. 117—218)

This invention relates to enameled wires; more particularly, it relates to wires coated with multiple layers of oleoresinous materials, epoxide resin compositions or acrylic polymers, and polyimide resin compositions.

It is well known that magnet wires may be made by coating copper wire with any one of a wide variety of natural and synthetic organic polymers. These include oleoresinous materials, epoxide resin compositions and acrylic polymers. While the vast assortment of such wires covers a very broad spectrum of properties, the ultimate use to which a given wire will be applied depends on the balance of electrical, chemical and mechanical properties possessed by the particular wire. In this respect, a common defect of the three types just mentioned is short dielectric life at elevated temperatures, e.g. 300° C.

On the other hand, a magnet wire coated with certain aromatic polyamides which are converted to polyimides upon curing in a wire-coating oven, has been shown to have a much higher thermal life than that of any of the above mentioned types. A defect of this wire, however, is that its coating tends to craze when it has not been properly annealed and the crazing, once it has occurred, will not heal with further heat treatment. Polyimide wires present the further disadvantage that the application of the enamel requires a rather expensive solvent system as compared to that used with more common enamels.

It is therefore an object of this invention to produce a magnet wire with improved dielectric stability at high temperatures. Another object is to achieve this improvement without unduly sacrificing any of the other electrical, chemical and mechanical properties that a magnet wire must possess, such as flexibility, good enamel adherence to metal, and others.

These and other objects are attained by applying a thin layer of a special polyamide enamel, special in that it is convertible into a polyimide upon curing, over or under several coats of "plain" enamel (as the oleoresinous materials are commonly known), epoxide resin compositions or acrylic polymers. In so doing, it has been observed that the thermal life of the combination coating is considerably longer, at high temperatures, than that of any of the mentioned enamels alone. In fact, an unexpected synergism is found to operate which boosts the thermal life of the combination wires beyond what could be expected from simple addition of the protection provided by each enamel individually.

The following examples will serve to illustrate but not to limit the invention.

Five different enamels were used in the examples: one oleoresinous, one epoxy, one acrylic, and two polyamide compositions. All but one of these enamels are commercially available. Their description follows.

Oleoresinous or "plain" enamel has been a standard insulation for some 50 years. It is prepared by chemically combining under heat natural resins and drying oils, usually tung oil. The particular preparation used here is available under the commercial designation "Hi T.S. Enamel No. 585."

The epoxy enamel used is sold as "Epi Rez 2184." It is based on a high molecular weight epoxide resin derived from bisphenol A and epichlorohydrin. The composition most probably also contains from 15 to 30% of a urea-formaldehyde resin, a certain quantity of polyvinyl formal and a Lewis type acid catalyst system.

The acrylic enamel is a water dispersion of an interpolymer of monomers consisting of acrylonitrile, an α-olefinic monocarboxylic acid, an ester of such acid with an aliphatic saturated monohydric alcohol, and a water-dilutable, heat-reactive aldehyde condensation resin. The particular enamel used here is marketed under the designation "Lecton."

One of the polyamides employed in the examples, (polyamide A), is the condensation product of pyromellitic dianhydride with 4,4'-oxydianiline. The oxydianiline was recrystallized from ethyl alcohol-dimethyl acetamide, and technical pyromellitic dianhydride was purified by heating at 250° C. for two hours at 80 mm. pressure. The resulting pyromellitic dianhydride, 14.8 g., was slurried in 71 ml. dry dimethyl acetamide in a three-neck, round-bottom flask fitted with a thermometer and an air condenser, protected with a calcium chloride tube. A solution of 13.4 g. oxydianiline in 71 ml. dry N-methylpyrrolidone was added. The reaction mixture was held at 50° C. for two hours. The polyamide solution thus obtained was applied on wire. Suffice it to say at this stage that the polyamide, after it has been applied to the wire, is converted in situ to a polyimide structure during the subsequent processing of the wire.

The other polyamide enamel used in the examples, polyamide B, is a commercial product marketed under the brand name "ML"; it consists essentially of a polyamide chemically similar to that in polyamide A, dissolved as a 15% by weight solution in a mixture of N-methylpyrrolidone and dimethyl acetamide and having a viscosity of about 4800 centipoises at 25° C.

EXAMPLES 1–4

The enamels were applied to number 18 (0.0403 inch) copper wire by conventional wire coating means, each layer of enamel being cured by passing the dipped wire through a vertical oven 12 feet high with a set cure temperature of 390° C. at a constant rate of speed selected from the range of 13 to 19 feet of wire per minute. A split applicator was employed so that the desired number of different coats could be put on in one continuous operation.

Control wires were prepared with the oleoresinous, the epoxy and the acrylic enamels by applying six successive coats of the enamels to the bare wire. Since each coat has a thickness of approximately 0.25 mil, the resulting wires were thus given a "heavy build," i.e. they had a diameter approximately 3.0 mils larger than that of the bare original wires. In the case of the polyamides, only one two-coat control wire with a build of approximately 1 mil was deemed sufficient.

The testing of the enameled wires was done by standard procedures. Although numerous chemical, physical and electrical properties of the control wires and of the new insulated wires were tested, the description of the testing procedures will be limited to that measuring the property in which significant changes were observed, namely the one-kilovolt life test.

*1 kilovolt-life test.*—The 1 kv.-life test was made in accordance with the provisions of the American Institute of Electrical Engineers specification No. 57, dated October 1955. The test is a measure of the period for which a coating can be exposed at the particular temperature indicated before it will fail as electrical insulation upon the application of 1000 volts for one second to the sample. Ten samples are used in each test.

Table I shows the significant properties of the control wires coated with standard enamels. The figures will serve as a basis for evaluating the new insulations of the later examples.

*Table I.—Control enamels*

| Example | Enamel | Build, (mils) | 1 kv. life (hours) | |
|---|---|---|---|---|
| | | | 250° C. | 300° C. |
| 1 | Oleoresinous | 3 | 28 | 3 |
| 2 | Epoxy | 3 | 73 | 10 |
| 3 | Acrylic | 3 | 25 | 2 |
| 4 | Polyamide B | 1 | 50 | 27 |

EXAMPLES 5–12

Wires were then prepared with insulation consisting of two contiguous coats of a polyamide composition placed under or over four contiguous coats of any one of the oleoresinous, epoxy or acrylic enamels. The relevant properties of these new wires are summarized in Table II.

*Table II.—Combination enamels*

| Example | Enamel | Build, (mils) | 1 kv. life (hours) | |
|---|---|---|---|---|
| | | | 250° C. | 300° C. |
| 5 | Oleoresinous over Polyamide B. | 2+1 | 365 | 35 |
| 6 | Epoxy over Polyamide B | 2+1 | 612 | 140 |
| 7 | Acrylic over Polyamide B | 2+1 | 560 | 65 |
| 8 | Oleoresinous over Polyamide A. | 2+1 | 320 | 32 |
| 9 | Polyamide B over Oleoresinous. | 1+2 | 250[10] | 60[10] |
| 10 | Polyamide B over Epoxy | 1+2 | 250[10] | 60[10] |
| 11 | Polyamide B over Acrylic | 1+2 | 250[10] | 42 |
| 12 | Polyamide A over Acrylic | 1+2 | 250[10] | 49 |

(NOTE.—The values accompanied by a superscript are not final in that at the time indicated by the figure, e.g. 250 hours in example 9 at 250° C., a number of samples represented by the superscript, 10 in this case, were still resisting the conditions of the test. Since the final values, in such cases, will necessarily be larger than those reported here, the invention is clearly described by the latter values.)

A comparison of these results with those for the control wires shown in Table I unquestionably demonstrates that the thermal life of any of the combination coatings is longer than not only that of each enamel entering in the combination but is also longer than the hypothetical value which might have been predicted by adding the protection afforded by each individual enamel. For instance, looking at the acrylic-polyamide B system, where the component enamels have 250° C. lives of 25 and 50 hours respectively (Table I, Examples 3 and 4) it would have been expected that the combination wire would have a life of 75 hours at that temperature; instead, as shown by Examples 7 and 11, the lives of the combination wires proved to be 560 hours in the case of the acrylic overcoat and more than 250 hours in the case of the polyamide overcoat. A synergistic effect therefore accounts for those surprising results.

It is evident, of course, that many widely different embodiments of this invention other than those provided in the examples may be made by persons skilled in the art without departing from the scope and the spirit thereof.

For instance, in lieu of the particular oleoresinous enamel used in Examples 1, 5, 8 and 9, any of the "plain enamels" available commercially may be used. The term "plain oleoresinous enamel" has acquired respectable currency in the trade. It encompasses a very large class of wire enameling preparations which have been, by and large, rather poorly described in the technical literature. They are best indentified by two common characteristics: (1) they belong mostly to the same standard thermal stability class, namely class 105° C., as defined in the 1957 Revised Standard No. 1 of the American Institute for Electrical Engineers (see Staff Report, Electrical Manufacturing, August 1957, page 112); (2) they are prepared by chemically combining under heat natural resins and drying oils. The natural resins employed include copal, shellac and rosin. Among the drying oils that may be used are tung oil, raw or alkali refined linseed oil, perilla oil, safflower oil and oiticia oil. Some of the commercial plain enamels also contain, in addition to or in lieu of the natural gums and resins, synthetic resins such as phenol-formaldehydes, melamine-formaldehydes and alkyd resins made of a phthalic acid glyceride which may or may not contain a drying oil.

The usable epoxy enamels are those falling within AIEE thermal class 130° C. They can be characterized as complex compositions of high molecular weight epoxide resins and fusible aldehyde-ammonia derivative condensates such as urea-formaldehydes, melamine-aldehydes, etc. The compositions also contain polyhydric phenols and, usually, other ingredients such as resins, e.g. polyvinyl formal, catalysts, and others. The proportions of the components may vary substantially but must remain such that the initial reaction products are capable of further reaction on the coated substrate to form insoluble and infusible products. A complete description of the satisfactory epoxy resins may be found in Greenlee, U.S.P. 2,528,359 and U.S.P. 2,528,360.

Any of the acrylic enamels described in Sanders, U.S.P. 2,787,561 and 2,787,603, may be employed in the practice of this invention. These enamels consist of an aqueous dispersion of an acrylic interpolymer blended with a solution or dispersion of a heat reactive aldehyde condensation resin, such as, e.g. phenol-formaldehyde, urea-formaldehyde, and others. The aldehyde condensation resin being present in an amount of about 5 to 20% based on the total weight of the interpolymer and the condensation resin. The interpolymer is obtained by the polymerization of acrylonitrile, an α-olefinic monocarboxylic acid and an ester of said acid with a 1–8 carbon atom saturated aliphatic monohydric alcohol and if desired, a glycidol derivative selected from the group consisting of esters of said acid with 2,3-epoxy-propanol-1 and allyl glycidyl ether.

The polyamides useful in this invention are the condensation products of tetracarboxylic aromatic acids with diamines and may be illustrated by the recurring structural unit

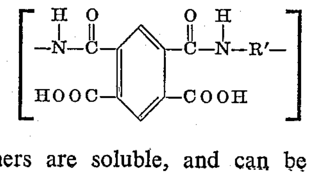

These polymers are soluble, and can be converted in situ, as mentioned earlier, by further heating into polyimide structures that are extremely resistant to solvents:

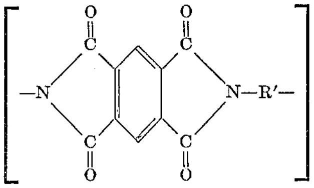

The pyromellitic acid residue incorporated in these formulae can be replaced of course with two ring tetracarboxylic acids, provided that the carboxylic groups of the latter compounds are arranged in two o-phthalic configurations. Meeting these requirements are, for example, the tetracarboxylic acids corresponding to naphthalene, diphenyl methane, 2,2′-diphenyl propane, diphenyl ether, diphenyl sulfide and diphenyl sulfone. The R′ of the formulae stands for a bivalent radical of either benzene, naphthalene, biphenyl, diphenyl ether, ditolyl ether, diphenyl sulfide, diphenyl sulfone, diphenyl methane 2,2′-diphenyl propane, benzophenone, or from a low molecular weight saturated aliphatic hydrocarbon containing not more than six carbon atoms.

The preferred class of polyamides is limited to the condensation products of pyromellitic dianhydride with a diamine characterized by a lack of aliphatic hydrogen atoms and by the possession of a flexible linkage such as the ether group of 4,4′-oxydianiline. These polyamides should preferably be such that they show a viscosity ranging from about 1300 centipoises to 5000 centipoises for a 15% by weight solution in 1:1 dimethylacetamide and N-methylpyrrolidone at 25° C.

The actual composition of the enamels employed, the number of layers of each enamel applied, the order of application of different enamels and the cure temperature are factors which must necessarily vary according to the balance of properties that the contemplated wire is to ultimately possess. Nevertheless, if the above described compositions are used in the recommended combinations, the improvement in thermal life which is the essence of this invention will be achieved despite the net effect of the interplay of such factors, provided that the latter are not allowed to vary beyond the following limits:

The permissible compositions of the enamels have already either been described or incorporated by reference to the Greenlee and Sanders patents.

As to the enamel cure temperature, it can range from 250° to 500° C. depending, among other things, on the type of enamels used and the speed of the wire through the curing tower.

The preferred number of coats of enamels are two and four for the polyamide and the other organic enamel respectively. This is for a "heavy build" magnet wire. Depending upon the diameter of the wire to be coated, the viscosity of the enamel solutions to be employed and the conditions under which the finished wire will be used, insulation of any thickness between 0.1 to 4.0 mils may be applied in 2 to 14 layers. In view of this, it is evident that no restriction to the two and four distribution of different enamel coats that is favored for heavy build wire is intended.

Various other materials such as fillers, plasticizers, coloring agents, and others, as well as minor amounts of other resins, may be incorporated into these enamels as is often done conventionally.

These new combinations of enamels may be used on any size of wire, on a variety of metals and on other materials. Non-electrical uses are also indicated where temperature stability, smoothness, flexibility are, among other properties, required of a synthetic finish.

Other applications will readily suggest themselves of course to those skilled in the art.

What is claimed is:

1. A metal conductor coated with multiple layers of (A) a polyimide composition comprising the polymeric condensation product of (1) an aromatic tetracarboxylic acid selected from the group consisting of the tetracarboxylic derivatives of benzene, naphthalene, diphenyl methane, 2,2′-diphenyl propane, diphenyl ether, diphenyl sulfide and diphenyl sulfone capable of forming dianhydrides, with (2) a diamino compound selected from the group consisting of diprimary amine substituted bivalent radicals of benzene, naphthalene, biphenyl, diphenyl ether, ditolyl ether, diphenyl sulfide, diphenyl sulfone, diphenyl methane, 2,2′-diphenyl propane, benzophenone and saturated aliphatic hydrocarbons containing up to six carbon atoms, and (B) another cured organic composition selected from the group consisting of: (1) the plain oleoresinous wire enamels; (2) epoxy enamels comprising high molecular weight epoxide resins, fusible aldehyde-ammonia derivative resins selected from the group consisting of urea-formaldehyde and melamine-formaldehyde condensate, and a polyhydric phenol; and (3) an acrylic enamel applied as an aqueous dispersion of an interpolymer obtained by the polymerization of acrylonitrile with an α-olefinic monocarboxylic acid and with an ester of said acid with a 1 to 8 carbon atom saturated aliphatic monohydric alcohol, blended with a dispersion of a heat reactive aldehyde condensate selected from the group consisting of phenol-formaldehyde, urea-formaldehyde and melamine-formaldehyde resins.

2. A metal conductor coated with insulation of a thickness of 0.1 to 4.0 mils consisting of 2 to 14 layers of the resins selected according to claim 1.

3. A metal conductor coated with multiple superposed cured layers of (A) a polyimide composition comprising the polymeric condensation product of pyromellitic dianhydride with 4,4′-oxydianiline, and of (B) and oleoresinous composition which is the heat induced reaction product of a natural resin selected from the group consisting of copal, rosin and shellac, with a drying oil selected from the group consisting of tung oil, raw linseed oil, alkali refined linseed oil, perilla oil, safflower oil and oiticia oil.

4. The metal conductor of claim 3 with two coats of polyimide composition and four coats of oleoresinous composition, each coat being approximately 0.25 mil thick.

5. A metal conductor coated with multiple superposed cured layers of (A) a polyimide composition comprising the polymeric condensation product of pyromellitic dianhydride with 4,4′-oxydianiline, and of (B) an aqueous dispersion of an interpolymer of monomers consisting of (a) 30 to 80 parts of acrylonitrile, (b) 2 to 15 parts of an α-olefinic monocarboxylic acid selected from the group consisting of acrylic acid, methacrylic acid, ethacrylic acid, phenyl acrylic acid and crotonic acid, and (c) 18 to 35 parts of an ester of said α-olefinic monocarboxylic acids with a saturated aliphatic monohydric alcohol of one to 8 carbon atoms for a total of 100 parts by weight and a water-dilutable heat-reactive aldehyde condensation resin selected from the group consisting of phenol-formaldehyde resin, urea-formaldehyde resin, urea-melamine-formaldehyde resin and melamine-formaldehyde resin, said composition being insoluble in a boiling mixture of equal volumes of toluene and ethyl alcohol, said aldehyde condensation resin being present in an amount of about 5 to 20% based on the total weight of the interpolymer and the condensation resin.

6. The metal conductor of claim 5 with two coats of polyimide composition and four coats of aqueous interpolymer dispersion, each coat being approximately 0.25 mil thick.

7. A metal conductor coated with multiple superposed cured layers of (A) a polyimide composition comprising the polymeric condensation product of pyromellitic dianhydride with 4,4′-oxydianiline, and of (B) another composition which is a complex reaction product obtained by heating substantial amounts of a fusible resinous condensate of an aldehyde with an organic ammonia derivative containing reactive hydrogen and selected from the class which consists of amines and amides, with a complex epoxide which is a polyether derivative of a polyhydric phenol containing epoxide groups and free from functional groups other than epoxide and hydroxyl groups, the proportions being within the range of from about equal amounts by weight of complex epoxide and aldehyde condensate to about 9 parts of complex epoxide and 1 part of aldehyde condensate.

8. The metal conductor of claim 7 with two coats of polyimide composition and four coats of the other composition, each coat being approximately 0.25 mil thick.

References Cited by the Examiner

UNITED STATES PATENTS

| | | | |
|---|---|---|---|
| 2,707,703 | 5/1955 | Dorst | 117—232 |
| 2,865,795 | 12/1958 | Morrison | 117—232 |
| 2,867,609 | 1/1959 | Edwards et al. | 260—78 |
| 2,935,427 | 5/1960 | Hall et al. | 117—218 |
| 2,938,885 | 5/1960 | Blanchette et al. | 260—78 |
| 2,944,993 | 7/1960 | Brebner et al. | 260—78 |
| 3,022,200 | 2/1962 | Koerner et al. | 117—218 |
| 3,105,775 | 10/1963 | Lavin et al. | 117—218 X |

RICHARD D. NEVIUS, *Primary Examiner.*